(12) United States Patent
Koike et al.

(10) Patent No.: US 8,178,450 B2
(45) Date of Patent: May 15, 2012

(54) $TiO_2$-CONTAINING SILICA GLASS AND OPTICAL MEMBER FOR EUV LITHOGRAPHY USING HIGH ENERGY DENSITIES AS WELL AS SPECIAL TEMPERATURE CONTROLLED PROCESS FOR ITS MANUFACTURE

(75) Inventors: Akio Koike, Chiyoda-ku (JP); Kenta Saito, Chiyoda-ku (JP); Long Shao, Chiyoda-ku (JP); Yasutomi Iwahashi, Chiyoda-ku (JP); Shinya Kikugawa, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/868,900

(22) Filed: Aug. 26, 2010

(65) Prior Publication Data

US 2010/0323871 A1    Dec. 23, 2010

Related U.S. Application Data

(63) Continuation of application No. PCT/JP2009/054106, filed on Feb. 26, 2009.

(30) Foreign Application Priority Data

Feb. 26, 2008 (JP) .................................. 2008-044811

(51) Int. Cl.
*C03C 3/06* (2006.01)
*C03C 3/04* (2006.01)
*C03B 37/018* (2006.01)

(52) U.S. Cl. ................. 501/54; 501/53; 65/413

(58) Field of Classification Search .................... 501/53, 501/54, 55, 56, 57; 65/413–423
See application file for complete search history.

(56) References Cited

U.S. PATENT DOCUMENTS

5,755,850 A * 5/1998 Martin et al. ................... 65/387
6,465,272 B1 * 10/2002 Davis et al. ..................... 438/72
7,294,595 B2   11/2007 Iwahashi et al.
(Continued)

FOREIGN PATENT DOCUMENTS

JP    2004-315351    11/2004
(Continued)

OTHER PUBLICATIONS

U.S. Appl. No. 12/862,174, filed Aug. 24, 2010, Koike, et al.
(Continued)

*Primary Examiner* — Jerry Lorengo
*Assistant Examiner* — Noah Wiese
(74) *Attorney, Agent, or Firm* — Oblon, Spivak, McClelland, Maier & Neustadt, L.L.P.

(57) ABSTRACT

The present invention provides a $TiO_2$—$SiO_2$ glass whose coefficient of linear thermal expansion in the range of the time of irradiation with EUV light is substantially zero when used as an optical member of an exposure tool for EUVL and which has extremely high surface smoothness. The present invention relates to a $TiO_2$-containing silica glass having a $TiO_2$ content of from 7.5 to 12% by mass, a temperature at which a coefficient of linear thermal expansion is 0 ppb/° C., falling within the range of from 40 to 110° C., and a standard deviation ($\sigma$) of a stress level of striae of 0.03 MPa or lower within an area of 30 mm×30 mm in at least one plane.

16 Claims, 1 Drawing Sheet

U.S. PATENT DOCUMENTS

| | | |
|---|---|---|
| 7,410,922 B2 | 8/2008 | Iwahashi et al. |
| 7,419,924 B2 | 9/2008 | Koike et al. |
| 7,429,546 B2 | 9/2008 | Iwahashi et al. |
| 7,462,574 B2 | 12/2008 | Iwahashi et al. |
| 7,485,593 B2 | 2/2009 | Ezaki et al. |
| 7,538,052 B2 | 5/2009 | Iwahashi et al. |
| 7,939,457 B2 * | 5/2011 | Hrdina et al. .................... 501/54 |
| 2002/0157421 A1 | 10/2002 | Ackerman et al. |
| 2007/0263281 A1 | 11/2007 | Maxon et al. |
| 2009/0122281 A1 | 5/2009 | Iwahashi et al. |
| 2009/0143213 A1 * | 6/2009 | Hrdina et al. .................... 501/53 |
| 2010/0261597 A1 | 10/2010 | Koike et al. |

FOREIGN PATENT DOCUMENTS

| | | |
|---|---|---|
| JP | 2005-104820 | 4/2005 |
| JP | 2005-519349 | 6/2005 |
| WO | 2004/089839 | 10/2004 |
| WO | 2005/066090 | 7/2005 |
| WO | 2006/080241 | 8/2006 |

OTHER PUBLICATIONS

U.S. Appl. No. 12/870,156, filed Aug. 27, 2010, Koike, et al.
U.S. Appl. No. 12/869,035, filed Aug. 26, 2010, Koike, et al.
U.S. Appl. No. 12/904,236, filed Oct. 14, 2010, Saitou, et al.

* cited by examiner

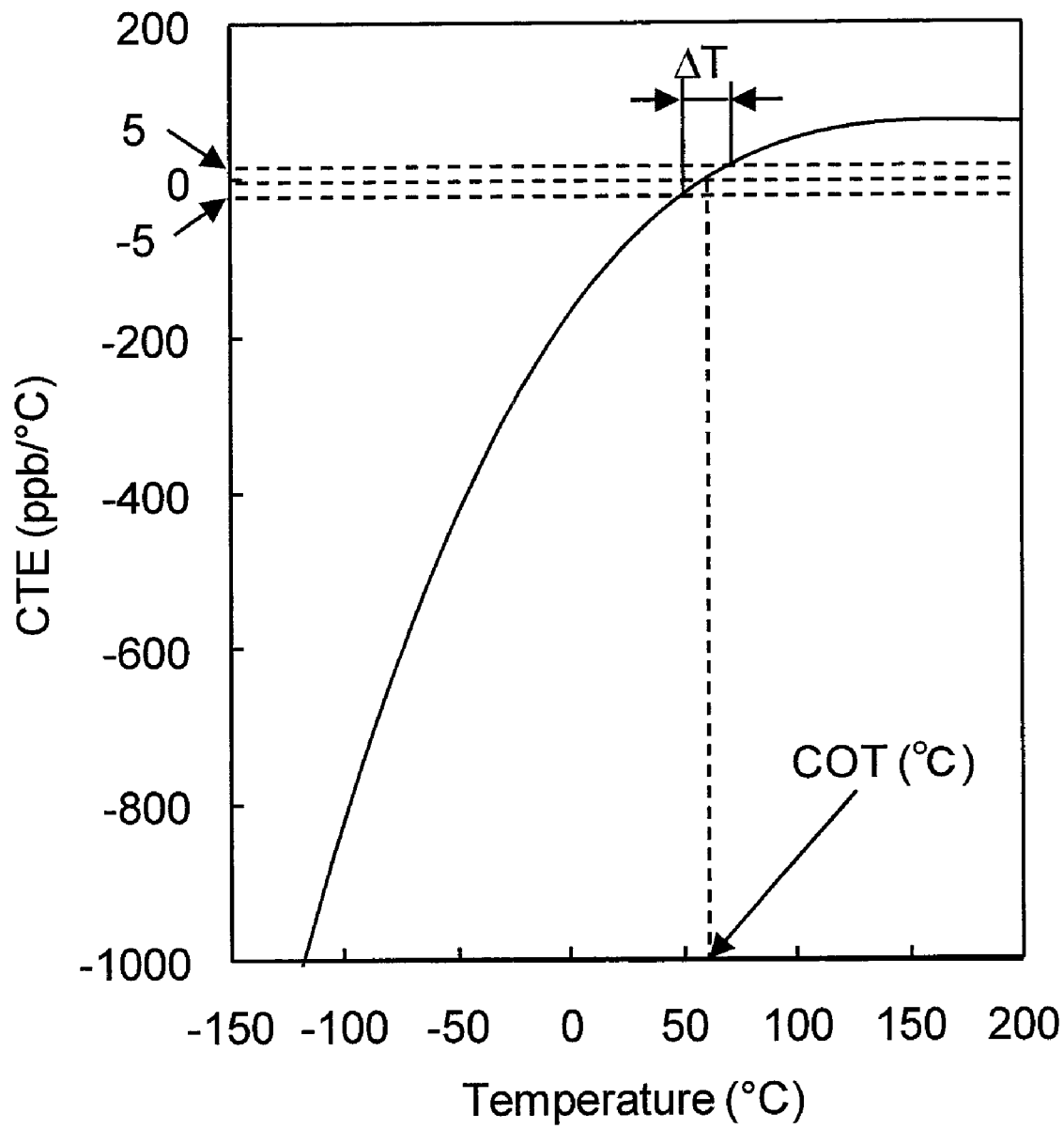

TIO₂-CONTAINING SILICA GLASS AND OPTICAL MEMBER FOR EUV LITHOGRAPHY USING HIGH ENERGY DENSITIES AS WELL AS SPECIAL TEMPERATURE CONTROLLED PROCESS FOR ITS MANUFACTURE

TECHNICAL FIELD

The present invention relates a $TiO_2$-containing silica glass (hereinafter referred to as "$TiO_2$—$SiO_2$ glass" in this specification), and in particular, to a $TiO_2$—$SiO_2$ glass to be used as an optical member of an exposure tool for EUV lithography. The EUV (extreme ultraviolet) light as referred to in the invention means light having a wavelength in a soft X-ray region or a vacuum ultraviolet region, specifically light having a wavelength of from about 0.2 to 100 nm.

BACKGROUND ART

In the photolithography technology, an exposure tool for manufacturing an integrated circuit by transferring a minute circuit pattern onto a wafer has hitherto been widely utilized. With the trend toward a higher degree of integration and a higher function of an integrated circuit, the refinement of the integrated circuit is advancing. The exposure tool is hence required to form a circuit pattern image with high resolution on a wafer surface at a long focal depth, and shortening of the wavelength of an exposure light source is being advanced. The exposure light source is further advancing from conventional g-line (wavelength: 436 nm), i-line (wavelength: 365 nm) and a KrF excimer laser (wavelength: 248 nm), and an ArF excimer layer (wavelength: 193 nm) is coming to be employed. Also, in order to cope with a next-generation integrated circuit whose circuit line width will become 70 nm or less, an immersion lithography technique and a double exposure technique, each using an ArF excimer laser, are regarded as being leading. However, it is considered that even these techniques would be able to cover only the generation with a line width of up to 45 nm.

Under the foregoing technical trends, a lithography technique using, as an exposure light source, light having a wavelength of 13 nm to represent EUV light (extreme ultraviolet light) is considered to be applicable over generation of 32 nm and thereafter, and is attracting attention. The principle of image formation of the EUV lithography (hereinafter referred to as "EUVL") is identical with that of the conventional lithography from the viewpoint that a mask pattern is transferred using a projection optical system. However, since there is no material capable of transmitting light therethrough in the EUV light energy region, a refractive optical system cannot be used. Accordingly, the optical systems are all reflecting optical systems.

The optical member of an exposure tool for EUVL includes a photomask and a mirror and is basically configured with (1) a substrate, (2) a reflective multilayer formed on the substrate and (3) an absorber layer formed on the reflective multilayer. For the reflective multilayer, an Mo/Si reflective multilayer in which an Mo layer and an Si layer are alternately laminated is investigated; and for the absorber layer, Ta and Cr are investigated. For the substrate, a material having a low coefficient of thermal expansion is required so as not to generate a strain even under irradiation with EUV light, and a glass having a low coefficient of thermal expansion or the like is investigated.

The $TiO_2$—$SiO_2$ glass is known as an extremely low thermal expansion material having a coefficient of thermal expansion (CTE) lower than that of a silica glass. Also, since the coefficient of thermal expansion can be controlled by the $TiO_2$ content in glass, a zero-expansion glass whose coefficient of thermal expansion is close to 0 can be obtained. Accordingly, the $TiO_2$—$SiO_2$ glass involves a possibility as a material to be used in an optical member of an exposure tool for EUVL.

According to the conventional preparation method of a $TiO_2$—$SiO_2$ glass, first of all, a silica precursor and a titania precursor are each converted into a gas phase and then mixed with each other. The mixture in a gas phase is introduced into a burner and thermally decomposed, thereby forming $TiO_2$—$SiO_2$ glass particles. This $TiO_2$—$SiO_2$ glass particle is deposited in a refractory container and melted therein simultaneously with the deposition, thereby forming a $TiO_2$—$SiO_2$ glass. Also, Patent Document 1 discloses a method in which a $TiO_2$—$SiO_2$ porous glass body is formed and converted into a glass body, and a mask substrate is then obtained.

However, in the $TiO_2$—$SiO_2$ glasses prepared in these methods, a periodic fluctuation in the $TiO_2/SiO_2$ composition ratio was generated, and this appeared as stripe-shaped striae at a pitch of from 10 to 200 μm. In the case of using a $TiO_2$—$SiO_2$ glass as an optical member for EUV lithography, it is necessary to polish the glass such that its surface has extremely high surface smoothness. However, in the $TiO_2$—$SiO_2$ glass, since sites different in a $TiO_2/SiO_2$ composition ratio are different in mechanical and chemical properties of the glass depending on the composition ratio, a polishing rate does not become constant. Therefore, it is hard to finish the glass surface after polishing so as to have extremely high surface smoothness. When a $TiO_2$—$SiO_2$ glass having stripe-shaped striae at a pitch of from 10 to 200 μm is polished, "waviness" with pitches of the same degree as in the stria pitches is generated. Therefore, it is very hard to obtain extremely high surface smoothness.

In order to obtain extremely high surface smoothness, a $TiO_2$—$SiO_2$ glass having a small fluctuation in the $TiO_2/SiO_2$ composition ratio is preferred. In Patent Document 2, the present inventors made extensive and intensive investigations regarding the relationship between a rotation rate of a seed rod in the stage of obtaining a porous $TiO_2$—$SiO_2$ glass body and the striae of a transparent $TiO_2$—$SiO_2$ glass body and as a result, found that the higher the rotation rate of the seed rod, the smaller the striae as well as the smaller the variation of the $TiO_2$ concentration of the transparent $TiO_2$—$SiO_2$ glass body. Also, they disclosed a $TiO_2$—$SiO_2$ glass having a fluctuation width (Δn) of refractive index of $2 \times 10^{-4}$ or less within an area of 30 mm×30 mm in at least one plane.

Patent Document 3 discloses a titania-containing silica glass having low-level striations and an optical element for vacuum ultraviolet and a method for manufacturing the same.

In Patent Document 4, the present inventors disclosed that the fictive temperature is correlated with the width of the temperature range of zero expansion, namely, the fictive temperature is correlated with ΔT, and more specifically, when the fictive temperature is high, the ΔT is narrow, whereas when the fictive temperature is low, the ΔT is wide.

Patent Document 1: US-A-2002-157421
Patent Document 2: JP-A-2004-315351
Patent Document 3: JP-T-2005-519349
Patent Document 4: JP-A-2005-104820

DISCLOSURE OF THE INVENTION

In order to increase throughput of the exposure tool for EUVL, it is effective to increase the EUV light energy to be used for the exposure. Therefore, in that case, there is a possibility that the temperature of the member rises exceeding an estimated temperature. Specifically, since there is a possibility that the temperature rises to the temperature range of from 40 to 110° C., it is preferred that the expansion is substantially zero at the above-mentioned temperature. This is because in the case of a photomask or the like, a change in pitch of a pattern is prevented from occurring, and in the case of a stepper mirror or the like, a change in shape is prevented from occurring.

It is known that the coefficient of linear thermal expansion of the $TiO_2$—$SiO_2$ glass varies with the concentration of $TiO_2$ to be contained (see, for example, P.C. Schultz and H. T. Smyth, in: R. W. Douglas and B. Ellis, *Amorphous Materials*, Willey, New York, p. 453 (1972)).

Accordingly, it is possible to regulate the temperature, at which zero expansion is attained, by regulating the $TiO_2$ content of the $TiO_2$—$SiO_2$ glass. Specifically, in the conventional $TiO_2$—$SiO_2$ glass in which zero expansion is attained at 22° C., the $TiO_2$ concentration is about 7% by mass. However, in a $TiO_2$—$SiO_2$ glass which is used in the case of increasing throughput of the exposure tool for EUVL, since zero expansion is attained at a temperature of 40° C. or higher, a $TiO_2$ concentration in the vicinity of 7.5% by mass or more is necessary, and hence, it is necessary to increase the $TiO_2$ concentration.

In order to increase the $TiO_2$ concentration of the $TiO_2$—$SiO_2$ glass, it is necessary to increase the relative amount of the titania precursor serving as a raw material of the $TiO_2$—$SiO_2$ glass. In comparison with the silica precursor, the titania precursor generally has a high boiling point and, after being converted into a vapor state, is easy to cause dew condensation on the way of conveyance into a burner. For that reason, the foregoing conventional technologies cause a problem that when the relative amount of the titania precursor is high, dew condensation occurs during the conveyance, thereby generating a fluctuation in the $TiO_2/SiO_2$ composition ratio in the finally obtained glass. Also, even when the dew condensation does not occur, because of an increase of the $TiO_2$ concentration, a fluctuation width of the $TiO_2/SiO_2$ composition ratio becomes large. Also, since the sites different in a $TiO_2/SiO_2$ composition ratio are different in mechanical and chemical properties of the glass depending on the composition ratio, the polishing rate does not become constant. Therefore, there is caused a problem that a glass having extremely high surface smoothness cannot be obtained.

In order to solve the foregoing problems of the conventional technologies, an object of the invention is to provide a $TiO_2$—$SiO_2$ glass aiming at an increase of throughput, which has suitable thermal expansion properties as an optical member for exposure tool using high EUV energy light and is able to impart extremely high surface smoothness. More specifically, an object of the invention is to provide a $TiO_2$—$SiO_2$ glass whose coefficient of linear thermal expansion in the range of the time of irradiation with high EUV energy light is substantially zero when used as an optical member of an exposure tool for EUVL and which has extremely high surface smoothness.

The present invention provides a $TiO_2$-containing silica glass having a $TiO_2$ content of from 7.5 to 12% by mass, a temperature at which a coefficient of linear thermal expansion is 0 ppb/° C., falling within the range of from 40 to 110° C., and a standard deviation ($\sigma$) of a stress level of striae of 0.03 MPa or lower within an area of 30 mm×30 mm in at least one plane.

The present invention provides a $TiO_2$-containing silica glass having a $TiO_2$ content of from 7.5 to 12% by mass, a temperature at which a coefficient of linear thermal expansion is 0 ppb/° C., falling within the range of from 40 to 110° C., and a maximum roughness (PV) of a stress level of striae of 0.2 MPa or lower within an area of 30 mm×30 mm in at least one plane.

Furthermore, the present invention provides a $TiO_2$-containing silica glass a having a $TiO_2$ content of from 7.5 to 12% by mass, a temperature at which a coefficient of linear thermal expansion is 0 ppb/° C., falling within the range of from 40 to 110° C., and a fluctuation width ($\Delta n$) of refractive index of $4 \times 10^{-4}$ or less within an area of 30 mm×30 mm in at least one plane.

It is preferred that the $TiO_2$—$SiO_2$ glass of the invention has an average coefficient of linear thermal expansion in the range of from 20 to 100° C. of 60 ppb/° C. or lower.

It is preferred that the $TiO_2$—$SiO_2$ glass of the invention has a fictive temperature of 1,100° C. or lower.

It is preferred that the $TiO_2$—$SiO_2$ glass of the invention is free from an inclusion.

Furthermore, the $TiO_2$—$SiO_2$ glass of the invention can be used as an optical member for EUV lithography, and the optical member for EUV lithography using the $TiO_2$—$SiO_2$ glass of the invention preferably has a surface smoothness (rms) of 3 nm or less.

The present invention provides a process for manufacturing the above-described $TiO_2$-containing silica glass, comprising gasifying the silica precursor, gasifying the titania precursor, and conveying the gasified silica precursor and the gasified titania precursor through a pipe A and a pipe B, respectively, to supply the gasified precursors to a burner, wherein the pipe B is set so as to have an increasing temperature toward the burner.

In the process for manufacturing the above-described $TiO_2$-containing silica glass of the present invention, it is preferred that the pipe B is controlled by PID control so that its temperature fluctuation width at each point is within $\pm 1°$ C.

In the process for manufacturing the above-described $TiO_2$-containing silica glass of the present invention, it is preferred that a gas flow velocity in the pipe B is 0.1 m/sec or more in terms of volume as converted into atmospheric pressure.

In the process for manufacturing the above-described $TiO_2$-containing silica glass of the present invention, it is preferred that the process further comprises a step of stirring each gas before the supply to the burner.

In the process for manufacturing the above-described $TiO_2$-containing silica glass of the present invention, it is preferred that the process further comprises a step of keeping a $TiO_2$—$SiO_2$ glass molded article formed in a prescribed shape at a temperature of from 600 to 1,200° C. for 2 hours or more, followed by decreasing the temperature to 500° C. or lower at an average temperature-decreasing rate of 10° C./hr or lower.

The $TiO_2$—$SiO_2$ glass of the invention is extremely suitable as an optical member of an exposure tool for EUVL because its changes in dimension and shape from room temperature against the temperature increase at the time of irradiation with high EUV energy light are very small, and a surface with extremely high surface smoothness is obtained.

BRIEF DESCRIPTION OF THE DRAWINGS

FIG. 1 is a graph plotting the relationship between CTE and the temperature.

BEST MODES FOR CARRYING OUT THE INVENTION

In the present invention, the $TiO_2$ content is from 7.5 to 12% by mass. If the $TiO_2$ content is within the above range, the temperature, at which the coefficient of linear thermal expansion (CTE) becomes 0 ppb/° C. (Cross-over Temperature; COT), tends to fall in the range of from 40 to 110° C. Specifically, when the $TiO_2$ content is less than 7.5% by mass, the COT tends to be lower than 40° C. Also, when the $TiO_2$ content exceeds 12% by mass, the COT tends to exceed 110° C., or negative expansion tends to occur in the range of from −150 to 200° C. Also, there is a possibility that a crystal of rutile, or the like is easily precipitated, or a bubble is easy to remain. The $TiO_2$ content is preferably 11% by mass or less, and more preferably 10% by mass or less. Also, the $TiO_2$ content is preferably 8% by mass or more, and more preferably 8.5% by mass or more.

In carrying out EUVL, for the purpose of preventing changes in dimension and shape due to a change in temperature of an optical member such as a mirror, it is preferable that the COT falls within the range of from 40 to 110° C., preferably from 45 to 100° C., and especially preferably from 50 to 80° C. in the present invention.

In the present invention, the standard deviation ($\sigma$) of a stress level of striae is 0.03 MPa or lower within an area of 30 mm×30 mm in at least one plane. When the standard deviation ($\sigma$) exceeds 0.03 MPa, there is a possibility that the surface roughness after polishing becomes large so that extremely high surface smoothness is not obtained. The standard deviation ($\sigma$) is more preferably 0.02 MPa or lower, and especially preferably 0.01 MPa or lower.

In the present invention, the maximum roughness (PV) of a stress level of striae is preferably 0.2 MPa or lower within an area of 30 mm×30 mm in at least one plane. When the maximum roughness (PV) exceeds 0.2 MPa, since the sites different in a $TiO_2/SiO_2$ composition ratio are different in mechanical and chemical properties of the glass depending on the composition ratio, the polishing rate does not become constant. For that reason, there is a possibility that the surface roughness after polishing becomes large so that extremely high surface smoothness is not obtained. The maximum roughness (PV) is more preferably 0.17 MPa or lower, further preferably not more than 0.15 MPa and especially preferably 0.10 MPa or lower.

In the present invention, the root mean square (RMS) of a stress level of striae is preferably 0.2 MPa or lower within an area of 30 mm×30 mm in at least one plane. When the root mean square (RMS) is 0.2 MPa or lower, there is a possibility that the surface roughness after polishing becomes small so that extremely high surface smoothness is easily obtainable. The root mean square (RMS) is more preferably 0.17 MPa or lower, further preferably 0.15 MPa or lower, and especially preferably 0.1 MPa or lower.

The stress of striae of the $TiO_2$—$SiO_2$ glass can be determined according to the following formula by a known method, for example, by measuring a region of about 1 mm×1 mm using a birefringent microscope to determine its retardation. $\Delta = C \times F \times n \times d$ Here, $\Delta$ represents a retardation; C represents a photoelastic constant; F represents a stress; n represents a refractive index; and d represents a sample thickness.

A profile of the stress is determined by the above method, from which can be determined the standard deviation ($\sigma$), the maximum roughness (PV) and the root mean square (RMS). More specifically, for example, a cube of about 40 mm×40 mm×40 mm is cut out from a transparent $TiO_2$—$SiO_2$ glass body, sliced in a thickness of about 1 mm from each of the planes of the cube and then polished to obtain a plate-shaped $TiO_2$—$SiO_2$ glass block of 30 mm×30 mm×0.5 mm. Using a birefringent microscope, helium neon laser light is vertically applied onto the plane of 30 mm×30 mm of this glass block, which is then enlarged with a magnification such that striae can be sufficiently observed; and the in-plane retardation distribution is examined and converted into stress distribution. In the case where the pitch of striae is fine, it is necessary to make the thickness of the plate-shaped $TiO_2$—$SiO_2$ glass block to be measured thin.

In the present invention, the fluctuation width ($\Delta n$) of refractive index is preferably $4 \times 10^{-4}$ or less within an area of 30 mm×30 mm in at least one plane. When the fluctuation width ($\Delta n$) of refractive index exceeds $4 \times 10^{-4}$, there is a possibility that the surface roughness after polishing becomes large so that extremely high surface smoothness is not obtained. The fluctuation width ($\Delta n$) of refractive index is more preferably $3.5 \times 10^{-4}$ or less, and further preferably $3 \times 10^{-4}$ or less.

In particular, in order to attain extremely high surface smoothness such as a surface smoothness(rms)$\leq$1 nm, the fluctuation width ($\Delta n$) of refractive index is preferably $2 \times 10^{-4}$ or less, more preferably $1.5 \times 10^{-4}$ or less, further preferably $1 \times 10^{-4}$ or less, and especially preferably $0.5 \times 10^{-4}$ or less.

With respect to a measurement method of the fluctuation width $\Delta n$ of refractive index, it can be carried out by a known method, for example, by using an optical interferometer. More specifically, for example, a cube of about 40 mm×40 mm×40 mm is cut out from a transparent $TiO_2$—$SiO_2$ glass body, sliced in a thickness of about 0.5 mm from each of the planes of the cube and then polished to obtain a plate-shaped $TiO_2$—$SiO_2$ glass block of 30 mm×30 mm×0.2 mm Using a small-aperture Fizeau interferometer, only light having a specified wavelength is taken out from white light using a filter is vertically applied onto the plane of 30 mm×30 mm of this glass block, which is then enlarged with a magnification such that striae can be sufficiently observed; and the retardation distribution in the plane is examined, thereby measuring a fluctuation width $\Delta n$ of refractive index. In the case where the pitch of striae is fine, it is necessary to make the thickness of the plate-shaped $TiO_2$—$SiO_2$ glass block to be measured thin.

In the case of evaluating striae using the foregoing birefringent microscope or optical interferometer, there is a possibility that the size of one pixel in CCD is not sufficiently small as compared with the width of striae, and there is a possibility that the striae cannot be sufficiently detected. In that case, it is preferred that the whole region in the range of 30 mm×30 mm is divided into plural small regions of, for example, about 1 mm×1 mm, thereby carrying out the measurement of each of the small regions.

In the $TiO_2$—$SiO_2$ glass of the invention, a difference between a maximum value and a minimum value of the $TiO_2$ concentration within an area of 30 mm×30 mm in one plane is preferably 0.06% by mass or less and more preferably 0.04% by mass or less. When the difference is 0.06% by mass or less, there is a possibility that the surface roughness after polishing becomes small so that extremely high surface smoothness is easily obtainable.

As the method for manufacturing the $TiO_2$—$SiO_2$ glass of the invention, there are several processes as follows. As one example thereof, there is a manufacturing method in which a $TiO_2$—$SiO_2$ glass fine particle (soot) obtained by flame hydrolysis or thermal decomposition of a silica precursor and a titania precursor each serving as a glass-forming raw material is deposited and grown by a soot process, thereby obtaining a porous $TiO_2$—$SiO_2$ glass body; and the obtained porous $TiO_2$—$SiO_2$ glass body is subsequently heated to a densification temperature or higher under a reduced pressure or in a helium atmosphere and further heated to a transparent vitrification temperature or higher, thereby obtaining a $TiO_2$—

SiO$_2$ glass body. Examples of the soot process include an MCVD process, an OVD process and a VAD process depending upon the preparation manner.

Also, there is a manufacturing method in which a silica precursor and a titania precursor each serving as a glass-forming raw material are hydrolyzed and oxidized in an oxyhydrogen flame at from 1,800 to 2,000° C., thereby obtaining a TiO$_2$—SiO$_2$ glass body.

The densification temperature as referred to in this specification means a temperature at which the porous glass body can be densified to such an extent that a void cannot be confirmed by an optical microscope. Also, the transparent vitrification temperature as referred to herein means a temperature at which a crystal cannot be confirmed by an optical microscope, and a transparent glass is obtained.

At that time, in order to obtain a TiO$_2$—SiO$_2$ glass, it is necessary to increase the relative amount of the titania precursor serving as a raw material for increasing the TiO$_2$ concentration. In comparison with the silica precursor, the titania precursor generally has a high boiling point and, after being converted into a vapor state, is easy to cause dew condensation on the way of conveyance into a burner. Also, a fluctuation width of the TiO$_2$/SiO$_2$ composition ratio becomes large because of an increase of the TiO$_2$ concentration.

In order to obtain the TiO$_2$—SiO$_2$ glass with small striae of the invention, it is necessary to thoroughly control the temperature of pipes for conveying the raw materials, especially a pipe for conveying the titania precursor. The present inventors have found that in the case of gasifying the titania precursor in a high concentration by bubbling, for the purpose of reducing the striae, it is effective to control the temperature of the pipe higher than the bubbling temperature and set up it such that the temperature increases with a progress toward the burner. When a low-temperature portion exists, the volume of the gas temporarily decreases in the low-temperature portion, whereby the concentration of the titania precursor to be introduced into the burner becomes uneven.

Also, the present inventors have found that a fluctuation of the pipe temperature causes striae. For example, when in a pipe for conveying TiCl$_4$ at 0.5 m/sec, the temperature of the gas in a portion of the pipe having a length of 2 m fluctuates at a period of 30 seconds at 130° C.±1.5° C., a composition fluctuation of 0.1% by weight is generated. For that reason, in order to obtain the TiO$_2$—SiO$_2$ glass of the invention, it is preferred to control the temperature of the pipe through which the titania precursor is conveyed to a temperature fluctuation width within ±1° C. by PID control. The temperature fluctuation width is more preferably within ±0.5° C. Also, in addition to the pipe for conveying the titania precursor, it is preferred to control the temperature of the pipe for conveying the silica precursor to a temperature fluctuation width within ±1° C. by PID control. The temperature fluctuation width is more preferably within ±0.5° C. In order to heat the pipe, for the purpose of uniformly heating the pipe, it is preferred to wind a flexible heater, such as a ribbon heater or a rubber heater, around the pipe. In order to more uniformly heat the pipe, it is preferred to cover the pipe and the heater by an aluminum foil. Also, it is preferred that the most superficial layer is covered by a heat-insulating material, such as urethane or heat-resistance fiber cloth. In addition, in order to reduce the composition fluctuation, the gas flow velocity in the pipe may be increased. The flow velocity is preferably 0.1 m/sec or more, more preferably 0.3 m/sec or more, further preferably 0.5 m/sec or more, and especially preferably 1 in/sec or more in terms of volume as converted into atmospheric pressure.

In order to uniformly supply the gas, it is preferred to provide a stirring mechanism of the gas before supplying the silica precursor and the titania precursor into the burner. As the stirring mechanism, they may be considered two kinds of a mechanism in which the gas is fractionated and then joined by parts, such as a static mixer or a filter; and a mechanism in which the gas is supplied with averaging fine fluctuations by introducing into a large space. In order to obtain the TiO$_2$—SiO$_2$ glass of the invention, the glass is prepared preferably by using at least one of the above-mentioned stirring mechanisms, and more preferably by using the both. Also, in the stirring mechanisms, it is preferred to use the both of a static mixer and a filter.

In the TiO$_2$—SiO$_2$ glass of the invention, it is preferred that the average coefficient of linear thermal expansion in the range of from 20 to 100° C. is 60 ppb/° C. or lower. According to this, in carrying out irradiation with high-energy EUV light, even when the temperature of the optical member rises from room temperature to a high temperature, the changes in dimension and shape can be reduced. The average coefficient of linear thermal expansion in the range of from 20 to 100° C. is more preferably 50 ppb/° C. or lower, further preferably 40 ppb/° C. or lower, and especially preferably 30 ppb/° C. or lower. On the other hand, in the case where the COT is a high temperature, although the average coefficient of linear thermal expansion in the range of from 20 to 100° C. is liable to be a negative value, it is preferred for the same reasons that an absolute value of the average coefficient of linear thermal expansion in the range of from 20 to 100° C. is small. The average coefficient of linear thermal expansion in the range of from 20 to 100° C. is preferably −120 ppb/° C. or higher, more preferably −100 ppb/° C. or higher, and further preferably −60 ppb/° C. or higher. In the case where it is intended to make the change in dimension or shape smaller in carrying out irradiation with high-energy EUV light, the average coefficient of linear thermal expansion in the range of from 20 to 100° C. is preferably −50 ppb/° C. or higher, more preferably −40 ppb/° C. or higher, and especially preferably −30 ppb/° C. or higher.

Also, it is preferred that in the TiO$_2$—SiO$_2$ glass of the invention, the temperature width ($\Delta T$) at which the coefficient of linear thermal expansion (CTE) is 0±5 ppb/° C. is 5° C. or greater. In the case where the $\Delta T$ is 5° C. or greater, when the TiO$_2$—SiO$_2$ glass is used as an optical member of an exposure tool for EUVL, the thermal expansion of the optical member is suppressed at the time of irradiation with EUV light. The $\Delta T$ is more preferably 6° C. or greater, and further preferably 8° C. or greater. What the $\Delta T$ is 15° C. or greater is especially preferred because the CTE is able to attain 0±5 ppb/° C. in the temperature range of from 50 to 80° C.

In the TiO$_2$—SiO$_2$ glass of the invention, it is preferred that the TiO$_2$ content is from 7.5 to 12% by mass and that the fictive temperature is 1,100° C. or lower. When the fictive temperature is 1,100° C. or lower, the average coefficient of linear thermal expansion in the range of from 20 to 100° C. tends to become 60 ppb/° C. or lower; and in the case where the TiO$_2$—SiO$_2$ glass is used as an optical member of an exposure tool for EUVL, the thermal expansion due to a change in temperature of the optical member is suppressed at the time of irradiation with EUV light.

The fictive temperature is more preferably not higher than 1,000° C., and further preferably 950° C. or lower. In order to more reduce the average coefficient of linear thermal expansion in the range of from 20 to 100° C., the fictive temperature is preferably 900° C. or lower, more preferably 850° C. or lower, and especially preferably 800° C. or lower.

The COT, average coefficient of linear thermal expansion in the range of from 20 to 100° C. and $\Delta T$ of the TiO$_2$—SiO$_2$ glass can be determined by measuring the coefficient of linear thermal expansion (CTE) of the TiO$_2$—SiO$_2$ glass by a known method, for example, by using a laser interferometric dilatometer in the temperature range of from −150 to +200° C. and plotting the relationship between CTE and the temperature as shown in FIG. 1.

In order to obtain the TiO$_2$—SiO$_2$ glass of the invention having a fictive temperature of 1,100° C. or lower, a method of keeping a TiO$_2$—SiO$_2$ glass molded article formed in a prescribed shape at a temperature of from 600 to 1,200° C. for 2 hours or more and then decreasing the temperature to 500° C. or lower at an average temperature-decreasing rate of 10° C./hr or lower is effective. In order to decrease the fictive temperature even further, the temperature decrease is carried out preferably at a rate of 5° C./hr or lower, and more preferably at a rate of 3° C./hr or lower. When the temperature decrease is carried out at a slower average temperature-decreasing rate, a lower fictive temperature is attained. For example, when the temperature decrease is carried out at a rate of 1° C./hr or lower, the fictive temperature can be 900° C. or lower. In that case, however, when the temperature decrease is carried out only in the temperature range of from 1,000 to 800° C. at a low cooling rate, for example, at a rate of 1° C./hr or lower, and cooling is carried out in other temperature region at a cooling rate of 5° C./hr or higher, the time can be shortened.

The fictive temperature of the TiO$_2$—SiO$_2$ glass can be measured by known procedures. In the Examples as described below, the fictive temperature of the TiO$_2$—SiO$_2$ glass was measured by the following procedures.

With respect to a mirror-polished TiO$_2$—SiO$_2$ glass, an absorption spectrum is obtained by an infrared spectrometer (Magna 760, manufactured by Nikolet Company was used in the Examples as described below). In this measurement, a data-taking interval is set up at about 0.5 cm$^{-1}$, and an average value obtained by scanning 64 times is employed for the absorption spectrum. In the thus obtained infrared absorption spectrum, a peak observed in the vicinity of about 2,260 cm$^{-1}$ is attributed to an overtone of stretching vibration by an Si—O—Si bond of the TiO$_2$—SiO$_2$ glass. A calibration curve is prepared from a glass of the same composition having a known fictive temperature by using this peak position, thereby determining the fictive temperature. Alternatively, a reflection spectrum of the surface is measured in the same manner by using the same infrared spectrometer. In the thus obtained infrared reflection spectrum, a peak observed in the vicinity of about 1,120 cm$^{-1}$ is attributed to stretching vibration by an Si—O—Si bond of the TiO$_2$—SiO$_2$ glass. A calibration curve is prepared from a glass of the same composition having a known fictive temperature by using this peak position, thereby determining the fictive temperature. A shift of the peak position by a change in the glass composition can be extrapolated from the composition dependency of the calibration curve.

When the TiO$_2$—SiO$_2$ glass of the invention is used as an optical member of an exposure tool for EUVL, it is important to make the TiO$_2$/SiO$_2$ composition ratio in the glass uniform, from the standpoint of reducing a variation of the coefficient of linear thermal expansion in the glass.

In the TiO$_2$—SiO$_2$ glass of the invention, a variation of the fictive temperature is preferably within 50° C., and more preferably within 30° C. When the variation of the fictive temperature exceeds the foregoing range, there is a concern that a difference in the coefficient of linear thermal expansion is generated depending upon the site.

In this specification, the "variation of the fictive temperature" is defined as a difference between a maximum value and a minimum value of the fictive temperature within 30 mm×30 mm in at least one plane.

The variation of the fictive temperature can be measured as follows. A transparent TiO$_2$—SiO$_2$ glass body formed in a prescribed size is sliced to form a TiO$_2$—SiO$_2$ glass block of 50 mm×50 mm×1 mm. With respect to the 50 mm×50 mm plane of this TiO$_2$—SiO$_2$ glass block, by measuring a fictive temperature at intervals of a 10 mm pitch according to the foregoing method, the variation of the fictive temperature of the formed TiO$_2$—SiO$_2$ glass body is determined.

For the purpose of manufacturing the TiO$_2$—SiO$_2$ glass of the invention, a manufacturing method including the following steps (a) to (e) can be adopted.

Step (a):

A TiO$_2$—SiO$_2$ glass fine particle obtained through flame hydrolysis of a silica precursor and a titania precursor each serving as a glass-forming raw material are deposited and grown on a substrate, thereby forming a porous TiO$_2$—SiO$_2$ glass body. The glass-forming raw material is not particularly limited so far as it is a raw material capable of being gasified. Examples of the silica precursor include silicon halides such as chlorides, for example, SiCl$_4$, SiHCl$_3$, SiH$_2$Cl$_2$, SiH$_3$Cl, fluorides, for example, SiF$_4$, SiHF$_3$, SiH$_2$F$_2$, bromides, for example, SiBr$_4$, SiHBr$_3$, and iodides, for example, SiI$_4$; and alkoxysilanes represented by R$_n$Si(OR)$_{4-n}$ (wherein R represents an alkyl group having from 1 to 4 carbon atoms; n represents an integer of from 0 to 3; and the plural R may be the same or different). Also, examples of the titania precursor include titanium halides, for example, TiCl$_4$, TiBr$_4$; and alkoxy titaniums represented by R$_n$Ti(OR)$_{4-n}$ (wherein R represents an alkyl group having from 1 to 4 carbon atoms; n represents an integer of from 0 to 3; and the plural R may be the same or different). Also, as the silica precursor and the titania precursor, a compound of Si and Ti such as a silicon titanium double alkoxide can be used.

A seed rod made by silica glass (for example, the seed rod described in JP-B-63-24973) can be used as the substrate. Also, the shape of the substrate to be used is not limited to a rod form but may be in a plate form.

In supplying the glass-forming raw material, it is preferred to stabilize the supply of the glass raw material gas by controlling the foregoing pipe temperature and gas velocity.

Furthermore, it is preferred to provide the foregoing stirring mechanism of the glass raw material gas in the gas supply system.

According to any one of them, the stria level of the TiO$_2$—SiO$_2$ glass can be reduced, and each of the stress level of striae and the fluctuation width of refractive index can be controlled to a prescribed value or less.

As described above, the present inventors made extensive and intensive investigations regarding the relationship between a rotation rate of a seed rod in the stage of obtaining a porous TiO$_2$—SiO$_2$ glass body and striae of a transparent TiO$_2$—SiO$_2$ glass body. As a result, they found that the higher the rotation rate of the seed rod, the smaller the striae as well as the smaller the variation of the TiO$_2$ concentration of the transparent TiO$_2$—SiO$_2$ glass body (see Patent Document 2).

In the invention, in addition to the foregoing stabilization in supplying the raw material, it is preferred to rotate the seed rod at 25 rpm or more in forming a porous TiO$_2$—SiO$_2$ glass body. The rotation is carried out more preferably at 50 rpm or more, further preferably at 100 rpm or more, and especially preferably at 250 rpm or more.

In addition to the stabilization or homogenization in supplying the raw material in a vapor state, by rotating the seed rod at a high speed, a $TiO_2$—$SiO_2$ glass with small striae is obtained.

Step (b):

The porous $TiO_2$—$SiO_2$ glass body obtained in the step (a) is subjected to temperature rise to a densification temperature under a reduced pressure or in a helium atmosphere, thereby obtaining a $TiO_2$—$SiO_2$ dense body. The densification temperature is usually from 1,250 to 1,550° C., and especially preferably from 1,300 to 1,500° C.

Step (c):

The $TiO_2$—$SiO_2$ dense body obtained in the step (b) is subjected to temperature rise to the transparent vitrification temperature, thereby obtaining a transparent $TiO_2$—$SiO_2$ glass body. The transparent vitrification temperature is usually from 1,350 to 1,800° C., and especially preferably from 1,400 to 1,750° C.

As the atmosphere, an atmosphere of 100% of an inert gas such as helium or argon, or an atmosphere containing, as a major component, an inert gas, such as helium or argon, is preferred. The pressure may be a reduced pressure or normal pressure. In the case of a reduced pressure, the pressure is preferably 13,000 Pa or lower.

Step (d):

The transparent $TiO_2$—$SiO_2$ glass body obtained in the step (c) is heated at a temperature of the softening point or higher and formed in a desired shape, thereby obtaining a formed $TiO_2$—$SiO_2$ glass body. The forming temperature is preferably from 1,500 to 1,800° C. When the forming temperature is lower than 1,500° C., since the viscosity of the transparent $TiO_2$—$SiO_2$ glass is high, deformation due to own weight does not substantially proceed. Also, the growth of cristobalite which is a crystal phase of $SiO_2$, or the growth of rutile or anatase which is a crystal phase of $TiO_2$ tends to occur, thereby causing so-called devitrification. When the forming temperature exceeds 1,800° C., there is a possibility that sublimation of $SiO_2$ cannot be neglected.

The step (c) and the step (d) can be carried out continuously or simultaneously.

Step (e):

The formed $TiO_2$—$SiO_2$ glass body obtained in the step (d) is kept at a temperature of from 600 to 1,200° C. for one hour or more and then subjected to an annealing treatment for decreasing the temperature to not higher than 500° C. at an average temperature-decreasing rate of 10° C./hr or lower, thereby controlling the fictive temperature of the $TiO_2$—$SiO_2$ glass. Alternatively, the formed $TiO_2$—$SiO_2$ glass body obtained in the step (d) at 1,200° C. or higher is subjected to an annealing treatment for decreasing the temperature to 500° C. or lower at an average temperature-decreasing rate of 60° C./hr or lower, thereby controlling the fictive temperature of the $TiO_2$—$SiO_2$ glass. After decreasing the temperature to 500° C. or lower, natural cooling can be adaptable. In that case, the atmosphere is preferably an atmosphere of 100% of an inert gas, such as helium, argon, or nitrogen, an atmosphere containing, as a major component, such an inert gas, or an air atmosphere; and the pressure is preferably a reduced pressure or normal pressure.

For the purpose of attaining a lower fictive temperature, it is effective to carry out cooling at a slower cooling rate in a temperature region in the vicinity of an annealing point or a strain point of the glass. Also, irregularities of the polished surfaces by striae are caused by a stress to be generated by not only a difference in mechanical and chemical properties of the glass due to the fluctuation in the $TiO_2/SiO_2$ composition ratio but also a difference in the coefficient of linear thermal expansion caused due to the composition difference. Accordingly, for the purpose of reducing the stress between striae to suppress the formation of irregularities after polishing, it is effective to carry out cooling at a slower cooling rate in a temperature region in the vicinity of an annealing point or a strain point of the glass. Specifically, the slowest cooling rate in the cooling profile of the step (e) is preferably 10° C./hr or lower, more preferably 5° C./hr or lower, further preferably 3° C./hr or lower, and especially preferably 1° C./hr or lower.

In particular, in order to attain a lower fictive temperature, it is effective to carry out cooling at a slower cooling rate in a temperature region in the vicinity of an annealing point of the glass (for example, an annealing point±25° C.). Also, for the purpose of reducing the stress between striae to suppress the formation of irregularities after polishing, it is effective to carry out cooling at a slower cooling rate in a temperature region in the vicinity of a strain point of the glass (for example, a strain point±25° C.).

It is preferred that the $TiO_2$—$SiO_2$ glass of the invention is free from an inclusion. The inclusion as referred to herein means a foreign matter, a bubble or the like existing in the glass. There is a concern that the foreign matter is generated by contamination or crystal precipitation in a glass manufacturing process. In order to eliminate the inclusion, such as a foreign matter or a bubble, it is necessary to control the contamination especially in the step (a), and further to precisely control the temperature conditions of the steps (b) to (d).

An optical member of an exposure tool for EUVL using the $TiO_2$—$SiO_2$ glass of the invention is easy to obtain a surface with extremely high surface smoothness.

The surface smoothness (rms) of the optical member of an exposure tool for EUVL using the $TiO_2$—$SiO_2$ glass of the invention is preferably 3 nm or less, more preferably 2 nm or less, further preferably 1.5 nm or less, and especially preferably 1 nm or less.

The surface smoothness (rms) of the surface is measured by the following method.

With respect to a mirror polished glass surface, the surface shape in a region to be used as an optical member is measured by a non-contact surface shape measuring system (NewView 5032, manufactured by Zygo Corporation). For the measurement, an objective lens with a magnification of 2.5 is used. The measured surface shape is divided in every square region of 2×2 mm, from which are then calculated rms values, thereby defining smoothness. Also, in calculating the rms value, data processing is carried out using a band-pass filter having a wavelength of from 10 μm to 1 mm, and waviness components having a wavelength other than the foregoing wavelength region are eliminated.

EXAMPLES

The invention will be illustrated in greater detail with reference to the following Examples, but the invention should not be construed as being limited thereto. Examples 1 to 5 are invention examples, and the remainder is comparative examples.

Example 1

$TiO_2$—$SiO_2$ glass fine particles obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a seed rod rotating at a rotation rate of 250 rpm, thereby forming a porous $TiO_2$—$SiO_2$ glass body (step (a)).

By controlling a pipe of each of $SiCl_4$ and $TiCl_4$ by PID control, a fluctuation width of the gas temperature in the pipe is within ±0.5° C. The gas flow velocity in the pipe is 3.04 msec. The pipe is controlled so that its temperature is set higher than the bubbling temperature and furthermore is set so as to have an increasing temperature toward the burner. A stirring mechanism of the raw material gas is provided before supplying each of $SiCl_4$ and $TiCl_4$ into a burner.

Since it is hard to handle the obtained porous $TiO_2$—$SiO_2$ glass body without any treatment, the obtained porous $TiO_2$—$SiO_2$ glass body is kept in air at 1,200° C. for 6 hours together with substrate and then separated from the substrate.

Thereafter, the porous $TiO_2$—$SiO_2$ glass body is placed in an atmosphere-controllable electric furnace, and the pressure is reduced to 1300 Pa at room temperature. Thereafter, the temperature is increased to 1,450° C. in a helium gas atmosphere, and the system is kept at this temperature for 4 hours, thereby obtaining a $TiO_2$—$SiO_2$ dense body (step (b)).

The obtained $TiO_2$—$SiO_2$ dense body is heated to 1,700° C. in an argon atmosphere using a carbon furnace, thereby obtaining a transparent $TiO_2$—$SiO_2$ glass body (step (c)).

The obtained transparent $TiO_2$—$SiO_2$ glass body is heated to 1,750° C. and formed in a desired shape, thereby obtaining a formed $TiO_2$—$SiO_2$ glass body (step (d)).

The obtained glass is kept at 1,100° C. for 10 hours and then subjected to temperature decrease to 500° C. at a rate of 3° C./hr, followed by allowing it to stand for natural cooling (step (e)).

Example 2

A $TiO_2$—$SiO_2$ glass body is obtained in the same manner as in Example 1, except that in Example 1, the amount supplied of $TiCl_4$ is increased in the step (a); and that the rotation rate of the seed rod is changed to 25 rpm.

Example 3

A $TiO_2$—$SiO_2$ glass body is obtained in the same manner as in Example 1, except that in Example 1, the amount supplied of $TiCl_4$ is increased in the step (a); that the rotation rate of the seed rod is changed to 25 rpm; and that a stirring mechanism of the raw material gas is not provided before supplying each of $SiCl_4$ and $TiCl_4$ into a burner.

Example 4

A $TiO_2$—$SiO_2$ glass body is obtained in the same manner as in Example 1, except that in Example 1, the amount supplied of $TiCl_4$ is slightly increased in the step (a); and that cooling is carried out at a rate of 10° C./hr instead of rate-cooling in the step (e).

Example 5

A $TiO_2$—$SiO_2$ glass fine particle obtainable by gasifying $TiCl_4$ and $SiCl_4$ each serving as a glass-forming raw material of a $TiO_2$—$SiO_2$ glass, respectively and then mixing them and subjecting the mixture to heat hydrolysis (flame hydrolysis) in an oxyhydrogen flame is deposited and grown on a seed rod rotating at a rotation rate of 25 rpm, thereby forming a porous $TiO_2$—$SiO_2$ glass body (step (a)). By controlling a pipe of each of $SiCl_4$ and $TiCl_4$ by PID control, a fluctuation width of the gas temperature in the pipe is within ±0.5° C. The pipe is controlled so that its temperature is set higher than the bubbling temperature and furthermore is set so as to have an increasing temperature toward the burner.

Since it is hard to handle the obtained porous $TiO_2$—$SiO_2$ glass body without any treatment, the obtained porous $TiO_2$—$SiO_2$ glass body is kept in air at 1,200° C. for 6 hours together with the substrate and then separated from the substrate.

Thereafter, the porous $TiO_2$—$SiO_2$ glass body is placed in an atmosphere-controllable electric furnace, and the pressure is reduced to 1300 Pa at room temperature. Thereafter, water is charged in a glass-made bubbler; an He gas is bubbled under atmospheric pressure at 100° C.; and the mixture is kept in this atmosphere at 1,000° C. under normal pressure for 4 hours while introducing a water vapor together with an He gas, thereby conducting OH doping.

Thereafter, the temperature is increased to 1,450° C. in the same atmosphere, and the mixture is then kept at this temperature for 4 hours, thereby obtaining an OH-containing $TiO_2$—$SiO_2$ dense body (step (b)).

The obtained OH-containing $TiO_2$—$SiO_2$ dense body is heated to 1,700° C. in an argon atmosphere using a carbon furnace, thereby obtaining an OH-containing transparent $TiO_2$—$SiO_2$ glass body (step (c)).

The obtained OH-containing transparent $TiO_2$—$SiO_2$ glass body is heated to a temperature of the softening point or higher (1,750° C.) and formed in a desired shape, thereby obtaining an OH-containing formed $TiO_2$—$SiO_2$ glass body (step (d)).

The obtained glass is kept at 1,100° C. for 10 hours and then successively subjected to temperature decrease to 900° C. at a rate of 10° C./hr, temperature decrease to 700° C. at a rate of 1° C./hr and temperature decrease to 500° C. at a rate of 10° C./hr, followed by allowing it to stand for natural cooling (step (e)).

Example 6

A $TiO_2$—$SiO_2$ glass body is obtained in the same manner as in Example 4, except that in Example 4, the amount supplied of $TiCl_4$ is decreased in the step (a); that the rotation rate of the seed rod is changed to 25 rpm; that the control of the heater temperature is carried out by ON-OFF control but not PID control; that the fluctuation width of the gas temperature in a pipe of each of $SiCl_4$ and $TiCl_4$ is ±2° C. or more; and that a stirring mechanism of the raw material gas is not provided before supplying each of $SiCl_4$ and $TiCl_4$ into a burner.

Example 7

A $TiO_2$—$SiO_2$ glass body is obtained in the same manner as in Example 4, except that in Example 4, the amount supplied of $TiCl_4$ is decreased in the step (a); that the rotation rate of the seed rod is changed to 25 rpm; that the control of the heater temperature is carried out by ON-OFF control but not PID control; and that the fluctuation width of the gas temperature in a pipe of each of $SiCl_4$ and $TiCl_4$ is ±2° C. or more.

Example 8

A $TiO_2$—$SiO_2$ glass body is obtained in the same manner as in Example 4, except that in Example 4, the amount supplied of $TiCl_4$ is slightly decreased in the step (a); that the rotation rate of the seed rod is changed to 25 rpm; that in a part of the pipe, a site where the temperature is lower than that in the preceding portion exists; that the control of the heater temperature is carried out by ON-OFF control but not PID control; that the fluctuation width of the gas temperature in a pipe of each of SiCl$_4$ and TiCl$_4$ is ±2° C. or more; and that a stirring mechanism of the raw material gas is not provided before supplying each of SiCl$_4$ and TiCl$_4$ into a burner.

Example 9

ULE#7972, manufactured by Corning Incorporated, which is known as a zero-expansion TiO$_2$—SiO$_2$ glass.

Results of the measurement of respective physical properties of the glasses prepared in the foregoing Examples 1 to 9 are summarized and shown in Table 1. With respect to the evaluation methods, the measurements are made in accordance with the above-described measurement methods, respectively. Also, the COT shown in Table 1 is derived by determining the temperature at which the coefficient of linear thermal expansion is 0 ppb/° C. from the curve shown in FIG. 1. The ΔT shown in Table 1 is derived by determining the temperature range where the coefficient of linear thermal expansion is from −5 to 5 ppb/° C. from the curve shown in FIG. 1.

TABLE 1

| | TiO$_2$ [%] | OH concentration [ppm] | Fictive temperature [° C.] | COT [° C.] | ΔT [° C.] | Average coefficient of linear thermal expansion in the range of from 20 to 100° C. [ppm/° C.] |
|---|---|---|---|---|---|---|
| Example 1 | 8.2 | 30 | 960 | 52 | 6.6 | 5.8 |
| Example 2 | 8.7 | 20 | 960 | 75 | 7.8 | −27 |
| Example 3 | 8.7 | 20 | 950 | 73 | 7.9 | −28 |
| Example 4 | 8.3 | 20 | 1060 | 72 | 6.4 | −32 |
| Example 5 | 8.9 | 1030 | 790 | 52 | 8.8 | 0.7 |
| Example 6 | 6.7 | 30 | 1070 | 24 | 4.7 | 103 |
| Example 7 | 6.7 | 30 | 1060 | 24 | 4.8 | 101 |
| Example 8 | 7.7 | 30 | 1060 | 51 | 4.9 | 7 |
| Example 9 | 7.2 | 880 | 900 | −2.4 | 4.1 | 61 |

As is clear from Table 1, in Examples 1 to 5 in which the COT falls within the range of from 40 to 110° C., the coefficient of linear thermal expansion is substantially zero at the time of irradiation with high-EUV energy light, and the CTE is stably substantially zero over a wide temperature range, and therefore, the glasses of these Examples 1 to 5 are suitable as an optical member of an exposure tool for EUVL.

Also, the evaluation results of the stria level of the glasses of the foregoing Examples 1 to 9 are summarized and shown in Table 2. The evaluation methods are as follows. The surface smoothness (rms) of Examples 1 to 5 is 1 nm or less, and the surface smoothness (rms) of Example 8 is 3 nm or more.

TABLE 2

| | Stress level of stria | | Fluctuation width of refractive index Δn (ppm) |
|---|---|---|---|
| | Standard deviation σ [MPa] | Maximum roughness PV [MPa] | |
| Example 1 | <0.01 | 0.1 | <50 |
| Example 2 | 0.02 | <0.1 | — |
| Example 3 | 0.03 | 0.15 | 180 |
| Example 4 | <0.01 | 0.1 | <50 |
| Example 5 | 0.03 | 0.15 | — |
| Example 6 | 0.04 | 0.19 | — |
| Example 7 | 0.03 | 0.17 | — |
| Example 8 | 0.08 | 0.35 | — |
| Example 9 | 0.05 | 0.19 | 400 |

As is clear from Table 2, in the glasses of Examples 1 to 5 in which the standard deviation σ of a stress level of striae is 0.03 MPa or lower, the maximum roughness PV is 0.2 MPa or lower, and the fluctuation width of refractive index is $2\times10^{-4}$ or less, nevertheless the TiO$_2$ content is high as compared with the glasses of Examples 6 to 9, a surface with extremely high surface smoothness is obtained, and therefore, the glasses of these Examples 1 to 5 are suitable as an optical member of an exposure tool for EUVL.

As is clear from Examples 1 to 5 in Table 2, all of three stria-reducing method of (1) stabilization of the feed of glass raw material gases in supplying glass-forming raw materials, (2) installation of a stirring mechanism in a glass raw material gas feed system and (3) high-speed rotation of a seed rod are effective for attaining a standard deviation σ of a stress level of striae of 0.03 MPa or lower, a maximum roughness PV of 0.2 MPa or lower and a fluctuation width of refractive index of $2\times10^{-4}$ or lower.

While the invention has been described in detail and with reference to specific embodiments thereof, it will be apparent to one skill in the art that various changes and modifications can be made therein without departing from the sprit and scope thereof.

This application is based on Japanese patent application No. 2008-044811 filed on Feb. 26, 2008, the entire contents of which are incorporated hereinto by reference. All references cited herein are incorporated in their entirety.

Industrial Applicability

The TiO$_2$—SiO$_2$ glass of the invention is extremely suitable as an optical member of an exposure tool for EUVL because its changes in dimension and shape from room temperature against the temperature increase at the time of irradiation with high EUV energy light are very small, and a surface with extremely high surface smoothness is obtained.

The invention claimed is:

1. A TiO$_2$-containing silica glass, having a fictive temperature of 1,000° C. or lower, having a TiO$_2$ content of from 8.5 to 12% by mass, a temperature at which a coefficient of linear thermal expansion is 0 ppb/° C., falling within a range of from 40 to 110° C., a standard deviation (σ) of a stress level of striae of 0.03 MPa or lower within an area of 30 mm×30 mm in at least one plane, and having an average coefficient of linear thermal expansion, in a range of from 20 to 100° C., of from −30 ppb/° C. to 30 ppb/° C.

2. A TiO$_2$-containing silica glass, having a fictive temperature of 1,000° C. or lower, having a TiO$_2$ content of from 8.5 to 12% by mass, a temperature at which a coefficient of linear thermal expansion is 0 ppb/° C., falling within a range of 40 to 110° C., a maximum roughness peak-to-valley (PV) of a stress level of striae of 0.2 MPa or lower within an area of 30 mm ×30 mm in at least one plane, and having an average coefficient of linear thermal expansion, in a range of from 20 to 100° C., of from −30 ppb/° C. to 30 ppb/° C.

3. A $TiO_2$-containing silica glass, having a fictive temperature of 1,000° C. or lower, having a $TiO_2$ content of from 8.5 to 12% by mass, a temperature at which a coefficient of linear thermal expansion is 0 ppb/° C., falling within a range of 40 to 110° C., a fluctuation width ($\Delta n$) of the refractive index of $4\times10^{-4}$ or less within an area of 30 mm×30 mm in at least one plane, and having an average coefficient of linear thermal expansion, in a range of from 20 to 100° C., of from −30 ppb/° C. to 30 ppb/° C.

4. The $TiO_2$-containing silica glass according to claim 1, which is free from an inclusion.

5. An optical member for EUV lithography comprising the $TiO_2$-containing silica glass according to claim 1.

6. An optical member for EUV lithography comprising the $TiO_2$-containing silica glass according to claim 2.

7. An optical member for EUV lithography comprising the $TiO_2$-containing silica glass according to claim 3.

8. The optical member for EUV lithography according to claim 5, having a surface smoothness root mean square (rms) of 3 nm or less.

9. A process for manufacturing a $TiO_2$-containing silica glass according to claim 1, comprising gasifying a silica precursor, gasifying a titania precursor, and conveying the gasified silica precursor and the gasified titania precursor through a pipe A and a pipe B, respectively, to supply the gasified precursors to a burner, wherein the pipe B is set so as to have an increasing temperature toward the burner.

10. The process for manufacturing a $TiO_2$-containing silica glass according to claim 9, wherein the pipe B is controlled by PID control so that its temperature fluctuation width at each point is within ±1° C.

11. The process for manufacturing a $TiO_2$-containing silica glass according to claim 9, wherein a gas flow velocity in the pipe B is 0.1 m/sec or more in terms of volume as converted into atmospheric pressure.

12. The process for manufacturing a $TiO_2$-containing silica glass according to claim 9, further comprising a step of stirring each gas before the supply to the burner.

13. The process for manufacturing a $TiO_2$-containing silica glass according to claim 9, further comprising a step of keeping a $TiO_2$—$SiO_2$ glass molded article formed in a prescribed shape at a temperature of from 600 to 1,200° C. for 2 hours or more, followed by decreasing the temperature to 500° C. or lower at an average temperature-decreasing rate of 10° C./hr or lower.

14. The $TiO_2$-containing silica glass according to claim 1, further having a temperature width ($\Delta T$), at which the coefficient of linear thermal expansion is 0 ±5 ppb/° C., of 7.8° C. or more.

15. The $TiO_2$-containing silica glass according to claim 2, further having a temperature width ($\Delta T$), at which the coefficient of linear thermal expansion is 0 ±5 ppb/° C., of 7.8° C. or more.

16. The $TiO_2$-containing silica glass according to claim 3, further having a temperature width ($\Delta T$), at which the coefficient of linear thermal expansion is 0 ±5 ppb/° C., of 7.8° C. or more.

\* \* \* \* \*